(12) United States Patent
Fujiwara et al.

(10) Patent No.: US 9,442,030 B2
(45) Date of Patent: Sep. 13, 2016

(54) PEDAL OPERATION AMOUNT DETECTING DEVICE

(75) Inventors: Noboru Fujiwara, Toyota (JP); Hiroshi Isono, Mishima (JP); Hirofumi Otsuka, Kitasaku-gun (JP)

(73) Assignees: TOYODA IRON WORKS CO., LTD., Toyota-shi (JP); TOYOTA JIDOSHA KABUSHIKI KAISHA, Toyota (JP); MINEBEA CO., LTD., Kitasaku-gun (JP)

( * ) Notice: Subject to any disclaimer, the term of this patent is extended or adjusted under 35 U.S.C. 154(b) by 671 days.

(21) Appl. No.: 13/819,530

(22) PCT Filed: Jun. 3, 2011

(86) PCT No.: PCT/JP2011/062780
§ 371 (c)(1),
(2), (4) Date: Feb. 27, 2013

(87) PCT Pub. No.: WO2012/032817
PCT Pub. Date: Mar. 15, 2012

(65) Prior Publication Data
US 2013/0167664 A1 Jul. 4, 2013

(30) Foreign Application Priority Data
Sep. 7, 2010 (JP) ................... 2010-200137

(51) Int. Cl.
*G01L 1/04* (2006.01)
*G01L 5/00* (2006.01)
(Continued)

(52) U.S. Cl.
CPC .............. *G01L 5/0038* (2013.01); *B60T 7/042* (2013.01); *G05G 1/38* (2013.01)

(58) Field of Classification Search
CPC ............. G01B 7/16; G01L 1/22; B60T 7/06; G05G 1/30; G05G 1/38
USPC ............................................. 73/862.637, 774
See application file for complete search history.

(56) References Cited

U.S. PATENT DOCUMENTS 7,712,371 B2 * 5/2010 Fujiwara ................... 73/774
8,001,836 B2   8/2011 Isono
(Continued)

FOREIGN PATENT DOCUMENTS

| JP | A-11-255084 | 9/1999 |
| JP | A-2000-103325 | 4/2000 |

(Continued)

OTHER PUBLICATIONS

Office Action issued in Japanese Patent Application No. 2010-200137 dated Sep. 17, 2013 (with partial translation).
(Continued)

*Primary Examiner* — Lisa Caputo
*Assistant Examiner* — Octavia Hollington
(74) *Attorney, Agent, or Firm* — Oliff PLC (57) ABSTRACT

A pedal operation amount detecting device that is provided in an operating pedal apparatus including a transmitting member having a pedal arm of an operating pedal that is arranged so as to be pivotable about a support axis and that is depressed, and an output member to which a depression force is transmitted from the transmitting member and to which a reaction force corresponding to the depression force is applied, the pedal operation amount detecting device including a sensor member that is arranged on a load transmission path at a position offset from the transmitting member in a direction parallel to the support axis and that is deformed by the depression force and the reaction force, and the pedal operation amount detecting device electrically detecting a deformation of the sensor member.

14 Claims, 8 Drawing Sheets

(51) Int. Cl.
*B60T 7/04* (2006.01)
*G05G 1/38* (2008.04)

(56) References Cited

U.S. PATENT DOCUMENTS

| | | | |
|---|---|---|---|
| 8,707,820 B2* | 4/2014 | Fujiwara | 74/512 |
| 2006/0162434 A1 | 7/2006 | Saito et al. | |
| 2008/0223171 A1* | 9/2008 | Fujiwara et al. | 74/512 |
| 2008/0307920 A1 | 12/2008 | Fujiwara | |
| 2012/0255372 A1 | 10/2012 | Isono et al. | |
| 2013/0167664 A1 | 7/2013 | Fujiwara et al. | |
| 2015/0020642 A1* | 1/2015 | Fujiwara et al. | 74/512 |

FOREIGN PATENT DOCUMENTS

| | | |
|---|---|---|
| JP | A-2008-309585 | 12/2008 |
| WO | 2011/077231 A1 | 6/2011 |

OTHER PUBLICATIONS

Office Action/Search Report issued in Chinese Patent Application No. 201180043076.7 dated Mar. 5, 2014 (with partial translation).
Nov. 16, 2015 Search Report issued in European Patent Application No. 12870815.3.
Aug. 9, 2011 International Search Report issued in International Patent Application No. PCT/JP2011/062780.
Aug. 30, 2012 International Preliminary Report on Patentability issued in International Patent Application No. PCT/JP2011/062780.
Nov. 13, 2012 Written Opinion issued in International Patent Application No. PCT/JP2012/073526.
Nov. 13, 2012 International Search Report issued in International Patent Application No. PCT/JP2012/073526.
Jul. 6, 2016 Office Action issued in U.S. Appl. No. 14/383,294.
U.S. Appl. No. 14/383,294, filed Sep. 5, 2014 in the name of Fujiwara et al.

* cited by examiner

PEDAL OPERATION AMOUNT DETECTING DEVICE

TECHNICAL FIELD

The invention relates generally to a pedal operation amount detecting device, and more specifically to a pedal operation amount detecting device that achieves high detection accuracy.

BACKGROUND ART

There is a pedal operation amount detecting device provided in an operating pedal apparatus that includes: a transmitting member including a pedal arm of an operating pedal that is arranged so as to be pivotable about a support axis and that is depressed; and an output member to which a depression force is transmitted from the transmitting member and to which a reaction force corresponding to the depression force is applied. The pedal operation amount detecting device includes a sensor member, which is arranged on a load transmission path of the transmitting member and which is deformed by the depression force and the reaction force, and the pedal operation amount detecting device electrically detects a deformation of the sensor member. The pedal operation amount detecting device is suggested as a device that detects a depression force or a depression stroke of for example, a brake pedal for a service brake, a brake pedal for a parking brake, an accelerator pedal or a clutch pedal of a vehicle. A device described in Patent Document 1 is an example of the above-described device. An operating rod 26 corresponds to the output member, a clevis 28 corresponds to the transmitting member, and a rod-like member 40 corresponds to the sensor member.

RELATED ART DOCUMENT

Patent Document

Patent Document 1: Japanese Patent Application Publication No. 2000-103325

SUMMARY OF THE INVENTION

Problem to be Solved by the Invention

However, in the pedal operation amount detecting device described in the above-mentioned Patent Document 1, the rod-like member 40 (sensor member) is supported by a pin 42 in a cantilever manner as shown in FIG. 4 of this document. Therefore, depending on the position at which the clevis 28 and the rod-like member 40 are coupled to each other, a reaction force applied portion to which a reaction force is applied from the clevis 28 and an operation input portion to which a depression force is applied from the pin 42 may be offset (deviate in position) from each other in a direction parallel to a support axis of an operating pedal. If such an offset occurs, an offset load is generated, so that the posture of the sensor member and the deformation manner of the sensor member itself change due to, for example, a backlash caused by dimension errors of various portions. As a result, the detection accuracy may be unstable and uneven wear of a rotational sliding portion may occur. Therefore, there is room for improvement in durability.

The invention is made in light of the above-described circumstances, and it is an object of the invention to improve the detection accuracy and durability of a pedal operation amount detecting device that detects a depression force or a depression stroke on the basis of a deformation of a sensor member arranged between a pedal arm and an output member.

Means for Solving the Problem

To achieve the object, the first aspect of the invention provides a pedal operation amount detecting device that is provided in an operating pedal apparatus including a transmitting member having a pedal arm of an operating pedal that is arranged so as to be pivotable about a support axis and that is depressed, and an output member to which a depression force is transmitted from the transmitting member and to which a reaction force corresponding to the depression force is applied, the pedal operation amount detecting device including a sensor member that is arranged on a load transmission path at a position offset from the transmitting member in a direction parallel to the support axis and that is deformed by the depression force and the reaction force, and the pedal operation amount detecting device electrically detecting a deformation of the sensor member, characterized in that: (a) the sensor member is arranged on the transmitting member via a pair of support pins which are parallel to the support axis, respectively, on which a coupling pin is arranged to penetrate the sensor member and relatively rotatable around an axis parallel to the support pin such that the depression force is applied to the sensor member from one of the transmitting member and the coupling pin, and the reaction force is applied to the sensor member from the other one, and (b) an operation input portion through which the depression force is applied to the sensor member and a reaction force applied portion through which the reaction force is applied to the sensor member are set at positions that overlap with each other in a direction substantially parallel to the support axis.

The second aspect of the invention provides the pedal operation amount detecting device recited in the first aspect of the invention, wherein (a) the transmitting member is a plate-like member that has a flat portion which is perpendicular to the support axis, and is arranged so as to be pivotable about the support axis or an axis that is parallel to the support axis; (b) the sensor member has an elongate shape, and is arranged parallel to a side face of the flat portion of the transmitting member; (c) the pedal operation amount detecting device includes a cylindrical member that is fixedly arranged at a longitudinal middle portion of the sensor member so as to protrude perpendicularly toward the transmitting member, and that is inserted in a through-hole formed in the transmitting member with a play, (d) a bushing that is fixedly fitted to an inner side of the cylindrical member so as to be concentric with the cylindrical member, and through which the coupling pin is passed such that the coupling pin is rotatable relative to the bushing and is in sliding contact with an inner periphery of the bushing; and (e) the pair of support pins are provided at both longitudinal end portions of the sensor member so as to protrude toward the transmitting member in a direction parallel to the cylindrical member, and are respectively inserted in a pair of support holes formed in the transmitting member to support the sensor member.

The third aspect of the invention provides the pedal operation amount detecting device recited in the second aspect of the invention, wherein (a) the pair of support pins are fixedly fitted to the sensor member, and are respectively inserted in the support holes so as to be rotatable relative to the support holes; (b) the bushing is fixedly fitted to the cylindrical member at a position at which the bushing overlaps with the support holes in the direction substantially parallel to the support axis; and (c) one of points of contact between the pair of support pins and the support holes and a point of contact between the bushing and the coupling pin functions as the operation input portion, and the other one functions as the reaction force applied portion.

The fourth aspect of the invention provides the pedal operation amount detecting device recited in the second or third aspect of the invention, wherein (a) in a state where the transmitting member and the sensor member are placed on an inner side of a bifurcated clevis fixedly fitted to the output member, a clevis pin that serves as the coupling pin is passed through the bushing so as to be rotatable relative to the bushing and so as to extend through the clevis, the transmitting member and the sensor member and protrude on both sides of the clevis; and (b) the reaction force is applied from the clevis pin to the sensor member via the cylindrical member, and the depression force is applied from the transmitting member to the sensor member via the pair of support pins.

The fifth aspect of the invention provides the pedal operation amount detecting device recited in the second to fourth aspects of the invention, wherein (a) the transmitting member is the pedal arm; and (b) the depression force is applied from the pedal arm to the sensor member via the pair of support pins, and the reaction force is applied from the coupling pin to the sensor member via the cylindrical member.

The sixth aspect of the invention provides the pedal operation amount detecting device recited in any one of the first to fourth aspects of the invention, wherein (a) an intermediate lever that is arranged so as to be pivotable about an axis parallel to the support axis, and that is coupled to the pedal arm via a coupling link is comprised, wherein (b) the transmitting member is the intermediate lever.

Effects of the Invention

In such a pedal operation amount detecting device, when the sensor member is arranged on the side face, or the like of the transmitting member, at a position that is offset from the transmitting member in the direction parallel to the support axis, the operation input portions to which the depression force is applied and the reaction force applied portion to which the reaction force is applied are set at the positions that overlap with each other in the direction parallel to the support axis. Therefore, an offset load due to an offset (deviation in position) between the operation input portions and the reaction force applied portion in the direction parallel to the support axis is suppressed. Therefore, the posture and deformation manner of the sensor member become stable, and uneven wear of the rotational sliding portions is suppressed. As a result, the detection accuracy and durability improve.

In the second aspect of the invention, the elongate sensor member is arranged on the side face of the transmitting member (e.g. pedal arm or intermediate lever). Therefore, in comparison with the case where detecting devices are provided in series between the operating pedal and the output member (operating rod), for example, as described in the Patent Document 1, the operating pedal apparatus is configured in a more compact size because the longitudinal dimension of the operating pedal apparatus is maintained at the same level as the conventional one. In addition, the cylindrical member is fixedly fitted to the longitudinal middle portion of the sensor member and is inserted in the through-hole formed in the transmitting member. Further, since the coupling pin is passed through the cylindrical member via the bushing, which is fixedly arranged in the cylindrical member, so as to be rotatable relative to the cylindrical member, the both ends of the coupling pin can be supported to apply the depression force or the reaction force. Therefore, the posture of the coupling pin becomes stable, which contributes to improvement in the detection accuracy. In addition, it is possible to easily change the mounting position of the bushing to the cylindrical member, and it is possible to easily adjust the position of the operation input portions or the reaction force applied portion that is a portion that contacts the coupling pin. Further, since the respective longitudinal end portions of the sensor member are supported by the transmitting member via the pair of support pins, the posture of the sensor member becomes stable, and the detection accuracy improves in terms of this point as well.

In the third aspect of the invention, the pair of support pins are fixedly fitted to the sensor member, and are inserted in the support holes so as to be rotatable relative to the support holes, while the bushing is fixedly fitted to the cylindrical member at a position at which the bushing overlaps with the support holes in the direction parallel to the support axis. Therefore, the operation input portions and the reaction force applied portion are provided within the range of thickness of the transmitting member. As a result, when an excess depression force is applied, for example, even if the cylindrical member contacts the inner wall surface of the through-hole, an offset load due to a couple of forces that offsets in the direction parallel to the support axis is not applied, and an excess deformation and damage of the sensor member due to the contact are appropriately prevented.

In the fourth aspect of the invention, the sensor member is arranged at a portion at which the output member and the transmitting member are coupled to each other, and the pedal operation amount that is transmitted to the output member is detected. Therefore, it is possible to highly accurately detect the brake force, or the like in the case where a hydraulic brake, or the like is mechanically actuated via the output member, for example. In addition, in a state where the transmitting member and the sensor member are placed on the inner side of the bifurcated clevis fixedly fitted to the output member, the clevis pin that serves as the coupling pin is passed through the bushing so as to extend through the clevis, the transmitting member and the sensor member and protrude on both sides of the clevis, and so as to be rotatable relative to the bushing. Further, the both ends of the clevis pin are supported by the clevis. Therefore, the posture of the clevis pin becomes stable and the detection accuracy improves.

The fifth aspect of the invention is in the case where the transmitting member is the pedal arm, and the sixth aspect of the invention is in the case where the transmitting member is the intermediate lever. In the both case, it is possible to electrically detect the pedal operation amount (the depression force or the depression stroke) easily by arranging the sensor member on the side faces of them without the need for a significant design change.

BRIEF DESCRIPTION OF THE DRAWINGS

FIG. 1 is a view for explaining one example of a vehicle operating pedal apparatus for a service brake to which the invention is applied.

FIG. 2 is a view for explaining the depression force F and the reaction force R that are applied to the pedal operation amount detecting device according to the embodiment of FIG. 1.

FIG. 5 is a view for explaining another embodiment of the invention.

FIG. 8 is a view for explaining the comparative example which the operation input portions and the reaction force applied portion are offset from each other in the direction parallel to the support axis.

MODES FOR CARRYING OUT THE INVENTION

The pedal operation amount detecting device according to the invention is suitable for use in a brake pedal apparatus for a service brake. However, the pedal operation amount detecting device may be applied to other vehicle operating pedal apparatuses such as operating pedal apparatuses for an accelerator, for a clutch, and for a parking brake. The pedal operation amount detecting device may be applied to operating pedal apparatuses other than a vehicle operating pedal apparatus. The pedal operation amount detecting device electrically detects a deformation of the sensor member. The deformation of the sensor member corresponds to a depression force. Generally, a depression stroke of the operating pedal changes in accordance with the depression force. Therefore, the pedal operation amount detecting device is configured to detect a depression force or a depression stroke, or both of them, as a pedal operation amount. The depression force and the depression stroke may be obtained according to, for example, a map or an arithmetic expression set in advance, using a deformation amount of the sensor member, that is, an electric signal, as a parameter.

In order to detect a deformation of the sensor member, a strain gauge, or the like, is provided at a portion of the sensor member, which undergoes deformation (e.g. tensile deformation or compressive deformation). However, various types of deformation detecting means may be employed. For example, a displacement of a predetermined portion of the sensor member, for example, a displacement of a portion at which the cylindrical member is provided may be detected by a displacement sensor, or the like, or a rotational displacement of a portion that makes a relative rotation may be detected.

The output member is, for example, an operating rod of a brake booster or a push rod of a brake master cylinder, and is configured to mechanically actuate a wheel brake, or the like. However, the pedal operation amount detecting device according to the invention may be applied to an electric (by-wire) operating pedal apparatus that electrically controls a wheel brake, a vehicle driving device, or the like, on the basis of an electrically detected pedal operation amount. In this case, a stroke simulator, a reaction force mechanism, or the like, is coupled to the output member so that a predetermined reaction force is applied to the output member.

Usually, the operation input portion and the reaction force applied portion respectively have predetermined widths in the direction parallel to the support axis. The operation input portion and the reaction force applied portion need to at least partially overlap with each other. However, it is desirable that the center of the operation input portion and the center of the reaction force applied portion substantially coincide with each other. When the widths of these portions are different from each other, the narrower one may be completely within the range of width of the wider one.

In the second aspect of the invention, the sensor member has an elongate shape, and is arranged parallel to the side face of the flat portion of the transmitting member. However, when the first aspect of the invention is carried out, various modes are applicable. For example, the sensor member may be arranged at a front end edge of the pedal arm or the intermediate lever. It is desirable that, as the elongate sensor member, for example, a sensor member that is in a substantially linear shape under no-load conditions be used. However, various modes are applicable. For example, the elongate sensor member may be bent in a convex shape or a concave shape. The cylindrical member and the support pins are formed separately from the sensor member, and are integrated with the sensor member by welding, or the like, where necessary. However, if possible, the cylindrical member and the support pins may be integrally formed with the sensor member.

The above-described elongate sensor member is arranged in such a posture that the sensor member intersects with an input direction in which a depression force or a reaction force is input into the cylindrical member, and is desirably arranged in such a posture that the sensor member intersects with the input direction at substantially the right angle. The sensor member is pivoted about the coupling pin in accordance with a depressing operation of the operating pedal, and is arranged so as to be maintained in such a posture that the sensor member intersects with the input direction over the entire range of the depression stroke. If the sensor member contacts the transmitting member, the deformation may be hindered due to sliding resistance. Therefore, it is desirable that the sensor member be arranged on the side face of the transmitting member in a state where the sensor member is apart from the transmitting member by a predetermined distance, except the both end portions supported by the support pins. Washers, or the like, with a low friction may be interposed between the both end portions, which are supported by the support pins, and the transmitting member.

In the third aspect of the invention, the pair of support pins are fixedly fitted to the sensor member and are inserted in the support holes so as to be rotatable relative to the support holes. In the second aspect of the invention, conversely, the pair of support pins may be fixedly fitted to the support holes of the transmitting member by press-fitting, or the like, and may be coupled to pin holes, or the like, formed in the sensor member so as to be rotatable relative to the pin holes. In this case, the position at which the bushing is fixedly fitted to the cylindrical member needs to be set at substantially the same position as the points of contact between the pin holes, or the like, and the support pins in the direction parallel to the support axis, that is, set within the range of thickness of the sensor member.

In the fourth aspect of the invention, the clevis is fixedly fitted to the output member, and is coupled to the cylindrical member of the sensor member via the clevis pin so as to be rotatable relative to the cylindrical member. However, for example, when the intermediate lever is coupled to the operating pedal via the coupling link and the output member is coupled to the intermediate lever via the clevis, or the like, so as to be rotatable relative to the intermediate lever, the sensor member may be arranged at a portion of the operating pedal, to which the coupling link is coupled, or at a portion of the intermediate lever, to which the coupling link is coupled, and the coupling link may be coupled to the cylindrical member so as to be rotatable relative to the cylindrical member. In this way, the portion at which the sensor member is arranged is set as needed.

In the second aspect of the invention, the cylindrical member is passed through the through-hole formed in the transmitting member with a play so that a displacement of the cylindrical member due to a deformation of the sensor member is allowed. However, it is desirable that, when a depression force exceeds a regular range set in advance, the cylindrical member contacts the through-hole so that a further displacement of the cylindrical member, that is, a further deformation of the sensor member is inhibited. As a result, it is possible to appropriately detect a pedal operation amount within the regular range, and an excess deformation and damage of the sensor member are appropriately prevented when an excess depression force is applied.

Embodiment

Figure 1A:
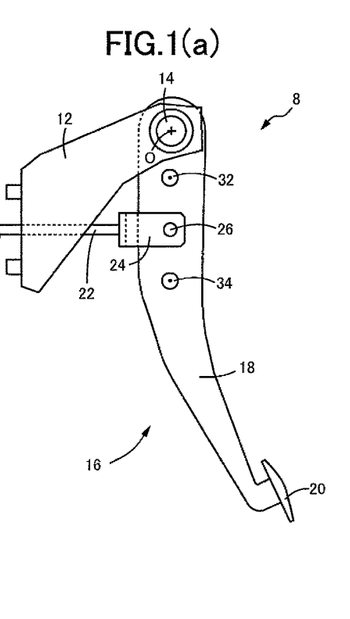
FIG. 1(a) is a left side view.
Figure 1B:
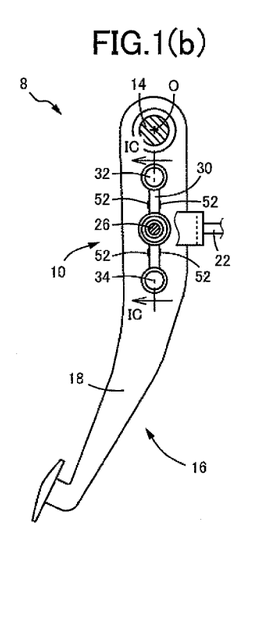
FIG. 1(b) is a right side view in which part of the vehicle operating pedal apparatus is omitted.
Figure 1C:
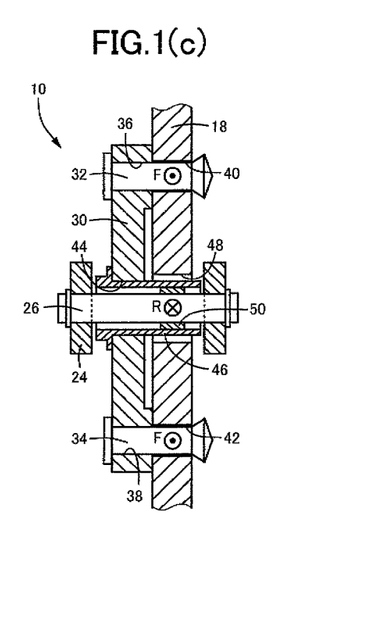
FIG. 1(c) is an enlarged sectional view taken along the line IC-IC in FIG. 1(b).

Hereinafter, an embodiment of the invention will be described in detail with reference to the drawings. FIG. 1 is a view that shows a vehicle operating pedal apparatus 8 for a service brake, which is provided with a pedal operation amount detecting device 10 according to an embodiment of the invention. FIG. 1(a) is a left side view as viewed from the left side of a vehicle in a state where the vehicle operating pedal apparatus 8 is mounted in the vehicle. FIG. 1(b) is a right side view in which part of the vehicle operating pedal apparatus 8 is omitted. FIG. 1(c) is an enlarged sectional view taken along the line IC-IC in FIG. 1(b). A pedal support 12 that is fixedly fitted to the vehicle is provided with an operating pedal 16 that is arranged so as to be pivotable about an axis (support axis) O of a support shaft 14 that is arranged substantially horizontally. The operating pedal 16 is depressed by a driver according to a request for braking. A depressing portion (pad) 20 is provided at the lower end portion of a flat plate-like pedal arm 18 that is perpendicular to the support axis O. An operating rod 22 of a brake booster is coupled to a middle portion of the pedal arm 18 via the pedal operation amount detecting device 10. The operating pedal 16 corresponds to an input member to which a depression force F is applied. The operating rod 22 corresponds to an output member to which the depression force F is transmitted from the operating pedal 16 via the pedal operation amount detecting device 10 and to which a reaction force R corresponding to the depression force F is applied by the brake booster. Note that, in the case of a by-wire operating pedal apparatus that electrically controls a wheel brake, a reaction force member to which a predetermined reaction force is applied by a reaction force mechanism, or the like, is coupled to the pedal win 18 instead of the operating rod 22.

A bifurcated (U-shaped) clevis 24 is fixedly fitted to the end portion of the operating rod 22 by screw coupling, or the like, and is coupled to the pedal operation amount detecting device 10 via a columnar clevis pin 26 that has a circular section and that extends parallel to the support shaft 14. The pedal operation amount detecting device 10 has an elongate sensor member 30 in a substantially linear shape. The sensor member 30 is arranged on a side face of the flat plate-like pedal arm 18 perpendicular to the support shaft 14, at a position that is offset from the pedal arm 18 in the direction parallel to the support axis O, so as to be parallel to the side face of the pedal arm 18. The sensor member 30 is attached to the pedal arm 18 via a pair of support pins 32, 34 that are fixedly fitted to respective longitudinal end portions of the sensor member 30. The support pins 32, 34 are fixedly press-fitted or integrally fixed by welding, or the like, to pin holes 36, 38 formed in the sensor member 30 so as to protrude perpendicularly toward the pedal arm 18, that is, so as to protrude parallel to the support axis O. In addition, the support pins 32, 34 are passed through support holes 40, 42 formed in the pedal arm 18 so as to be rotatable relative to the support holes 40, 42. The distal end portions of the support pins 32, 34 are swaged such that the support pins 32, 34 are prevented from slipping off. The pedal arm 18 corresponds to a transmitting member, and is a flat portion perpendicular to the support axis O as a whole.

A collar fitting hole 44 is formed at the longitudinal center of the sensor member 30, that is, at a middle position between the pair of support pins 32, 34. A cylindrical collar 46 is fixedly press-fitted or integrally fixed by welding, or the like, to the collar fitting hole 44 so as to protrude parallel to the support pins 32, 34 toward the pedal arm 18. A through-hole 48 is formed in the pedal arm 18 so as to be parallel to the support axis O. The cylindrical collar 46 is passed through the through-hole 48 with a predetermined play. In addition, a bushing 50 is fixedly arranged so as to be concentric with the cylindrical collar 46 by press-fitting, or the like, at a portion of the inner periphery of the cylindrical collar 46, which is at the center in the thickness direction of the pedal arm 18. The clevis pin 26 is passed through the bushing 50 so as to be rotatable relative to the bushing 50 in a state where the clevis pin 26 is in sliding contact with the inner periphery of the bushing 50. The pedal arm 18 and the sensor member 30 are placed on the inner side of the bifurcated clevis 24. Both end portions of the clevis pin 26, which extends through the cylindrical collar 46 and protrudes on both sides of the cylindrical collar 46, are supported by the clevis 24, and the clevis pin 26 is prevented from slipping off by snap rings, or the like. The cylindrical collar 46 corresponds to a cylindrical member. The clevis pin 26 corresponds to a coupling pin.

Figure 2A:
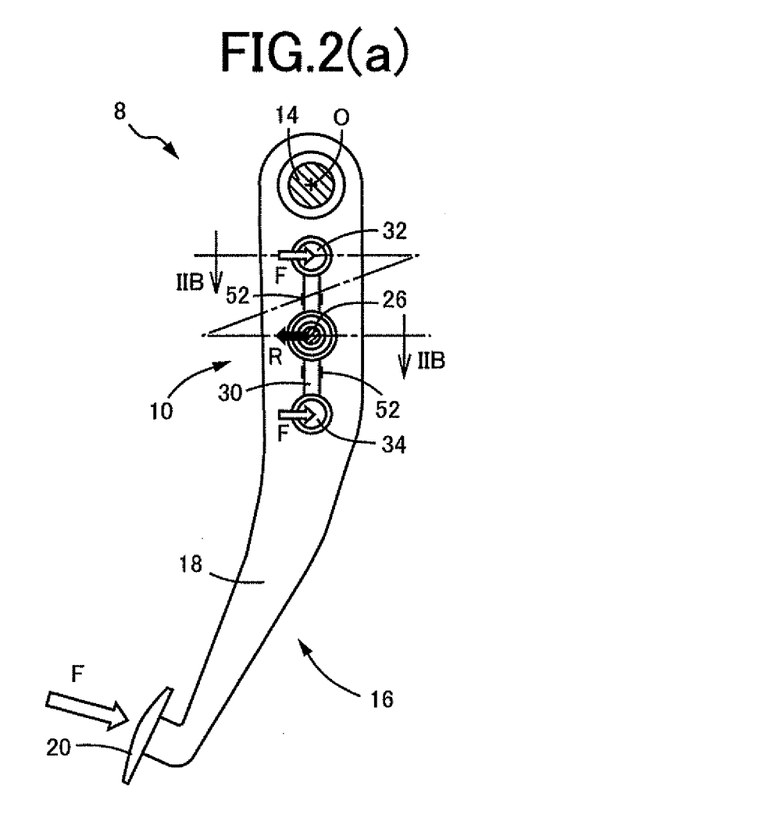
FIG. 2(a) is a right side view corresponding to FIG. 1(b).
Figure 2B:
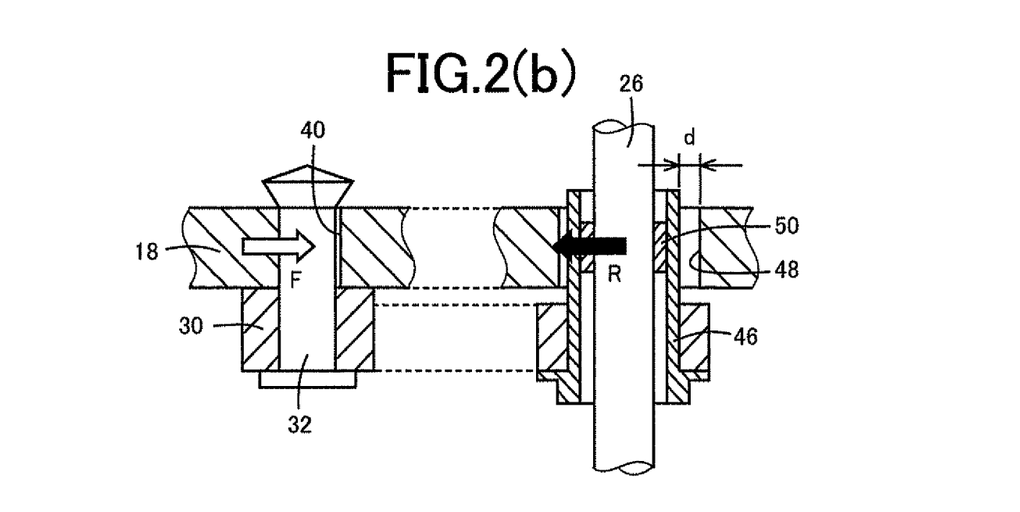
FIG. 2(b) is an enlarged sectional view taken along the line IIB-IIB in FIG. 2(a).

The sensor member 30 is arranged at the upper half of the pedal arm 18 so as to extend in the up-down direction along the pedal arm 18, and is coupled to the pedal arm 18 via the clevis pin 26 in such a posture that the sensor member 30 is arranged at substantially the right angle with the operating rod 22. The operating rod 22 extends substantially horizontally toward the front of the vehicle, and is pressed forward by the pedal arm 18. Therefore, as shown in FIG. 2, when the operating pedal 16 is depressed with the depression force F, the depression force F is applied to the sensor member 30 via the pair of support pins 32, 34, and is transmitted from the cylindrical collar 46 to the operating rod 22 via the bushing 50 and the clevis pin 26, while the reaction force R is applied from the clevis pin 26 to the cylindrical collar 46 via the bushing 50. Therefore, the sensor member 30 is deflected to be curved such that the center portion thereof protrudes relatively to the left in FIG. 2(a) on the basis of the depression force F and the reaction force R. Predetermined plays are provided between the support pins 32, 34 and the support holes 40, 42 so that a deflection of the sensor member 30 is allowed. Then, for example, by electrically detecting a deformation (compressive deformation or tensile deformation) of the sensor member 30 with the use of deformation detecting means 52, such as a strain gauge, provided on the side face of the sensor member 30, the depression force F is obtained as a pedal operation amount according to a map, an arithmetic expression, or the like, set in advance. The deformation detecting means 52 is provided, for example, at multiple positions so as to form a bridge circuit. FIG. 2(b) is an enlarged sectional view that is taken along the line IIB-IIB in FIG. 2(a), and is a view that shows sections of two portions that substantially overlap with each other in the up-down direction, two portions separately shown on the right side and left side in FIG. 2(b).

The sensor member 30 and the operating rod 22 are pivoted about the axis of the clevis pin 26 in accordance with a depressing operation of the operating pedal 16. The posture of the sensor member 30 in which the sensor member 30 is attached to the pedal arm 18 is set such that the sensor member 30 is maintained in such a posture that the sensor member 30 intersects with an input direction of the reaction force R over the entire range of the depression stroke. If the sensor member 30 is in contact with the pedal arm 18, the deformation manner becomes unstable due to sliding resistance. Therefore, the sensor member 30 is arranged parallel to the side face of the pedal arm 18 in a state where the sensor member 30 is apart from the pedal arm 18 by a predetermined distance, except the both end portions supported by the support pins 32, 34, and is deformed in substantially the constant deformation manner against the depression force F and the reaction force R. Note that, the depression force F may be obtained by detecting an amount of change in a clearance d shown in FIG. 2(b) with the use of a displacement sensor, such as a magnetic sensor. Instead of the depression force F or in addition to the depression force F, the depression stroke of the operating pedal 16 may be obtained from a map, or the like.

In this case, in the present embodiment, the support pins 32, 34 are fixedly fitted to the sensor member 30, and points of contact between the support pins 32, 34 and the support holes 40, 42 serve as operation input portions through which the depression force F acts on the sensor member 30. In addition, a point of contact between the clevis pin 26 and the bushing 50 serves as a reaction force applied portion through which the reaction force R is applied to the sensor member 30, and the bushing 50 is fixedly fitted to the inner periphery of the cylindrical collar 46 at a portion located at the center in the thickness direction of the pedal arm 18. Therefore, the operation input portions and the reaction force applied portion are located at substantially the same position in the direction parallel to the support axis O. Therefore, an offset load due to an offset (deviation in position) between the operation input portions and the reaction force applied portion in the direction parallel to the support axis O is suppressed. As a result, the deformation manner of the sensor member 30 becomes stable, and uneven wear, or the like, of portions at which the support pins 32, 34 and the support holes 40, 42 rotate relative to each other and a portion at which the clevis pin 26 and the bushing 50 rotate relative to each other is suppressed. The depression force F and the reaction force R shown in FIG. 1(c) indicate the positional relationship between them in the direction parallel to the support axis O (lateral direction in FIG. 1(c)).

As described above, in the pedal operation amount detecting device 10 according to the present embodiment, when the sensor member 30 is arranged on the side face of the pedal arm 18, at a position that is offset from the pedal arm 18 in the direction parallel to the support axis O, the operation input portions to which the depression force F is applied and the reaction force applied portion to which the reaction force R is applied are set at the positions that overlap with each other in the direction parallel to the support axis O. Therefore, an offset load due to an offset (deviation in position) between the operation input portions and the reaction force applied portion in the direction parallel to the support axis O is suppressed. Therefore, the posture and deformation manner of the sensor member 30 become stable, and uneven wear of the rotational sliding portions is suppressed. As a result, the detection accuracy and durability improve.

Figure 8A:
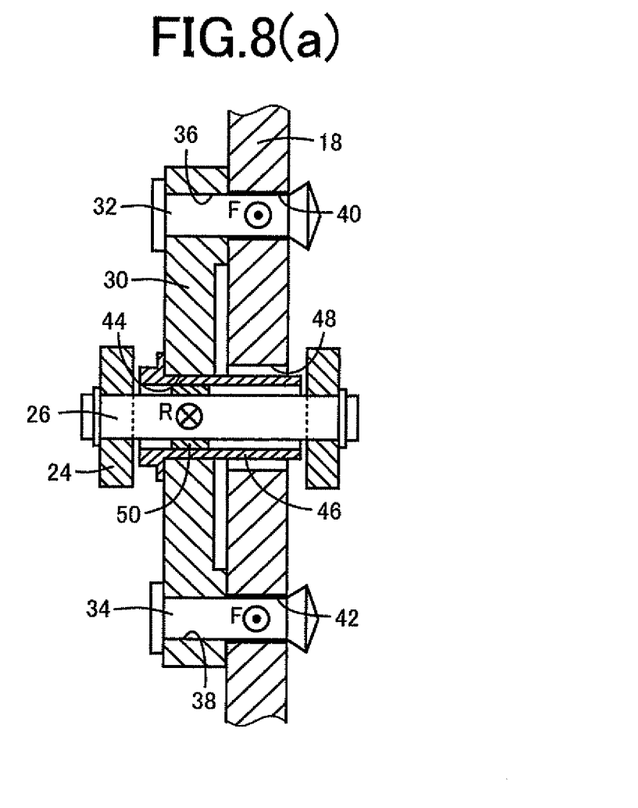
FIG. 8(a) is a sectional view corresponding to FIG. 1(c).
Figure 8B:
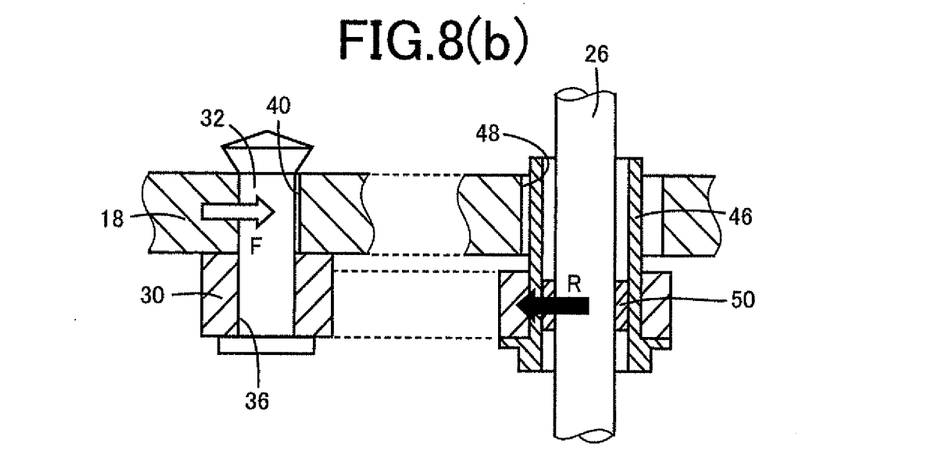
FIG. 8(b) is a sectional view corresponding to FIG. 2(b).

In contrast to this, FIG. 8 shows the case where the bushing 50 is fixedly fitted to the inner periphery of the cylindrical collar 46 at substantially the same position as the sensor member 30. In this case, the operation input portions to which the depression force F is applied and the reaction force applied portion to which the reaction force R is applied are offset from each other in the direction parallel to the support axis O, and have the relationship of a couple of forces as shown in FIG. 8(b). Due to an offset load generated by the couple of forces, the posture and deformation manner of the sensor member 30 become unstable and uneven wear occurs at the portions at which the support pins 32, 34 and the support holes 40, 42 rotate relative to each other and the portion at which the clevis pin 26 and the bushing 50 rotate relative to each other. As a result, the detection accuracy and durability are reduced. FIG. 8(a) is a sectional view corresponding to FIG. 1(c). FIG. 8(b) is a sectional view corresponding to FIG. 2(b).

In addition, in the present embodiment, the elongate sensor member 30 is arranged on the side face of the pedal arm 18. Therefore, in comparison with the case where detecting devices are provided in series between the operating pedal and the output member (operating rod), for example, as described in the Patent Document 1, the vehicle operating pedal apparatus 8 is configured in a more compact size and the vehicle mountability of the vehicle operating pedal apparatus 8 is improved because the longitudinal dimension of the vehicle operating pedal apparatus 8 is maintained at the same level as the conventional one. Particularly, because the sensor member 30 is arranged on the side face of the pedal arm 18, it is possible to electrically detect the depression force F easily without the need for a significant design change.

In addition, the cylindrical collar 46 is fixedly fitted to the longitudinal middle portion of the sensor member 30 and is inserted in the through-hole 48 formed in the pedal arm 18. Further, the clevis pin 26 is passed through the cylindrical collar 46 via the bushing 50, which is fixedly arranged in the cylindrical collar 46, so as to be rotatable relative to the cylindrical collar 46, and the both ends of the clevis pin 26 are supported by the clevis 24 and the reaction force R is applied to the clevis pin 26. Therefore, the posture of the clevis pin 26 becomes stable, which contributes to improvement in the detection accuracy.

In addition, because the bushing 50 is fixedly fitted to the inner periphery of the cylindrical collar 46 by press-fitting, or the like, it is possible to easily change the mounting position of the bushing 50, and it is possible to easily adjust the position of the reaction force applied portion that is a portion that contacts the clevis pin 26.

In addition, the pair of support pins 32, 34 are fixedly fitted to the respective longitudinal end portions of the sensor member 30, and the sensor member 30 is arranged on the side face of the pedal arm 18 via the support pins 32, 34. Therefore, the posture of the sensor member 30 becomes stable, and the detection accuracy improves in terms of this point as well.

In addition, the sensor member 30 is arranged at a portion at which the operating rod 22, which serves as the output member, and the pedal arm 18 are coupled to each other, and the depression force F that is transmitted to the operating rod 22 is detected. Therefore, it is possible to highly accurately detect a brake force of a hydraulic brake that is mechanically actuated via the operating rod 22.

In addition, in a state where the pedal arm 18 and the sensor member 30 are placed on the inner side of the bifurcated clevis 24 fixedly fitted to the operating rod 22, the clevis pin 26 that serves as the coupling pin is passed through the bushing 50 so as to extend through the clevis 24, the pedal arm 18 and the sensor member 30 and protrude on both sides of the clevis 24, and so as to be rotatable relative to the bushing 50. Further, the both ends of the clevis pin 26 are supported by the clevis 24. Therefore, the posture of the clevis pin 26 becomes stable and the detection accuracy improves.

The play between the through-hole 48 and the cylindrical collar 46 is set to such a dimension that, when the depression force F exceeds the regular range set in advance, the cylindrical collar 46 contacts the through-hole 48 so that a further displacement of the cylindrical collar 46, that is, a further deformation of the sensor member 30 is inhibited. As a result, it is possible to appropriately detect the depression force F within the regular range, and an excess deformation and damage of the sensor member 30 are appropriately prevented when an excess depression force F is applied.

Figure 3A:
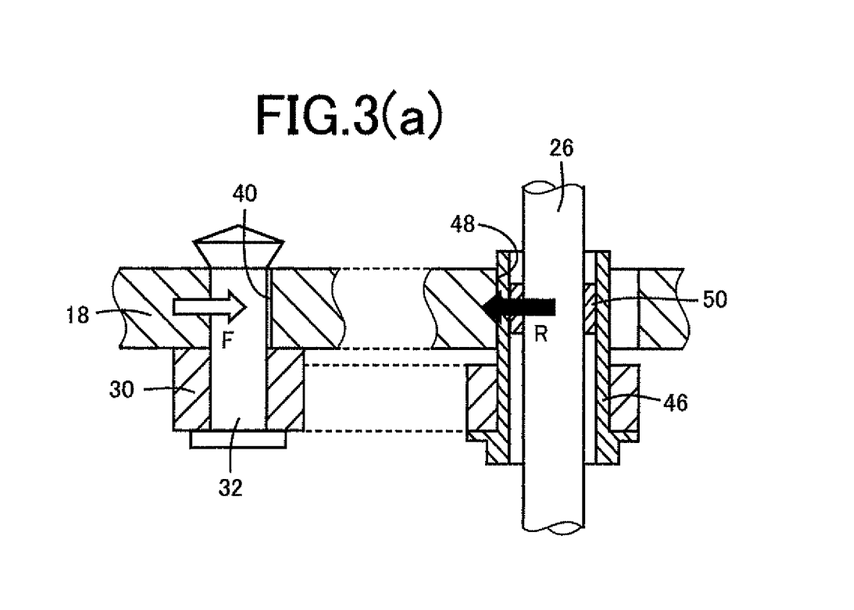
FIG. 3(a) is a sectional view corresponding to FIG. 2(b) in the case where the excess depression force is applied in the embodiment of FIG. 1.
Figure 3B:
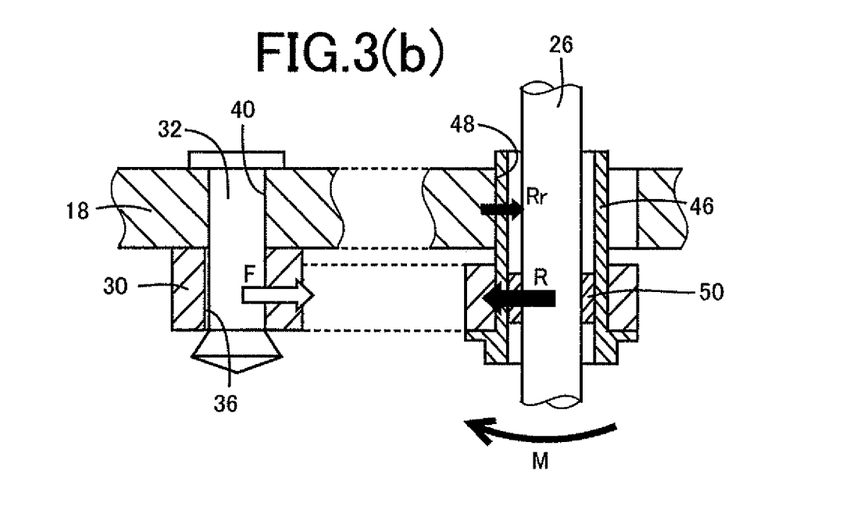
FIG. 3(b) is a sectional view corresponding to FIG. 2(b) when the excess depression force is applied in the embodiment of FIG. 5.

When the cylindrical collar 46 contacts the through-hole 48 due to the excess depression force F, the point of contact between the cylindrical collar 46 and the through-hole 48, the reaction force applied portion to which the reaction force R is applied and the operation input portion to which the depression force F is applied are all located within the range of thickness of the pedal arm 18 in the direction parallel to the support axis O (up-down direction in FIG. 3(a)) as shown in FIG. 3(a). Therefore, in such a case as well, an offset load due to a couple of forces is not applied to the sensor member 30, and an excess load is appropriately received by the pedal arm 18. As a result, an excess deformation and damage of the sensor member 30 due to application of an excess load to the sensor member 30 are appropriately prevented. FIG. 3(b) shows the case where the pair of support pins 32, 34 are fixedly fitted to the support holes 40, 42 of the pedal arm 18 and are coupled to the pin holes 36, 38 of the sensor member 30 so as to be rotatable relative to the pin holes 36, 38, the bushing 50 is fixedly arranged at a portion located within the range of thickness of the sensor member 30 in the direction parallel to the support axis O, and the operation input portion to which the depression force F is applied and the reaction force applied portion to which the reaction force R is applied are both located within the range of thickness of the sensor member 30. When the cylindrical collar 46 contacts the through-hole 48 due to the excess depression force F, a reaction force Rr is applied from the pedal arm 18 to the cylindrical collar 46. The reaction force Rr and the reaction force R are in the relationship of a couple of forces. Therefore, a moment M is generated, which creates a possibility that an excess load will be applied to the sensor member 30 and the sensor member 30 will be damaged. FIG. 3(a) and FIG. 3(b) are sectional views each corresponding to FIG. 2(b).

Figure 4:
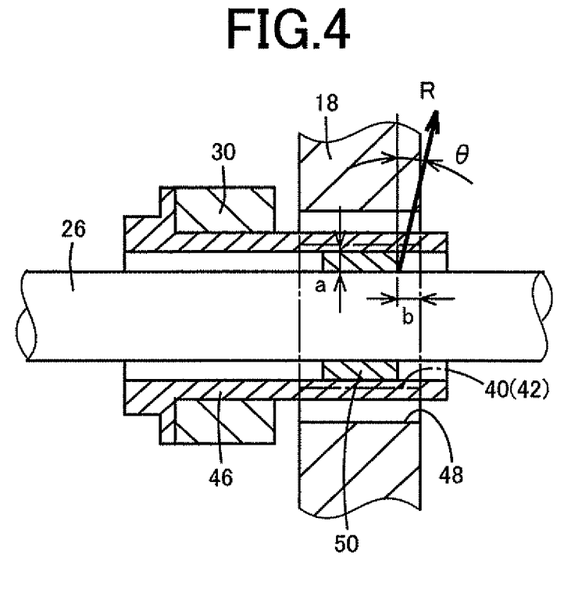
FIG. 4 is a sectional view enlarging the section in the vicinity of the cylindrical member in the embodiment of FIG. 1.

In addition, it is desirable that the wall thickness and width of the bushing 50 be set such that dimensions a, b shown in FIG. 4 satisfy the relationship expressed by the following mathematical expression (1) for an input angle (maximum value) θ of the reaction force R from the clevis pin 26. The dimension a is an amount of offset between the position of the inner periphery of the support hole 40 or 42 and the position of the inner periphery of the bushing 50 in a plan view as viewed from the longitudinal direction of the sensor member 30 as shown in FIG. 4, and the dimension b is an amount of retraction of the bushing 50 from the side face of the pedal arm 18 in the case where the bushing 50 is arranged symmetrically with respect to the thickness center of the pedal arm 18. By setting the dimensions a, b such that the relationship expressed by the mathematical expression (1) is satisfied, even when the input direction of the reaction force R changes within the range of the angle θ due to a backlash, or the like, of various portions, the reaction force R is input within the range of the operation input portions at which the support pins 32, 34 and the support holes 40, 42 contact each other in the plan view in FIG. 4. Therefore, the reaction force R is appropriately received by the pedal arm 18 that serves as the transmitting member, and the posture of the sensor member 30 becomes stable and the detection accuracy further improves.

$$\tan \theta \leq b/a \tag{1}$$

Next, another embodiment of the invention will be described. Note that, in the following embodiment, the same reference numerals are assigned to portions substantially the same as those in the above-described embodiment, and the detailed description is omitted.

Figure 5A:
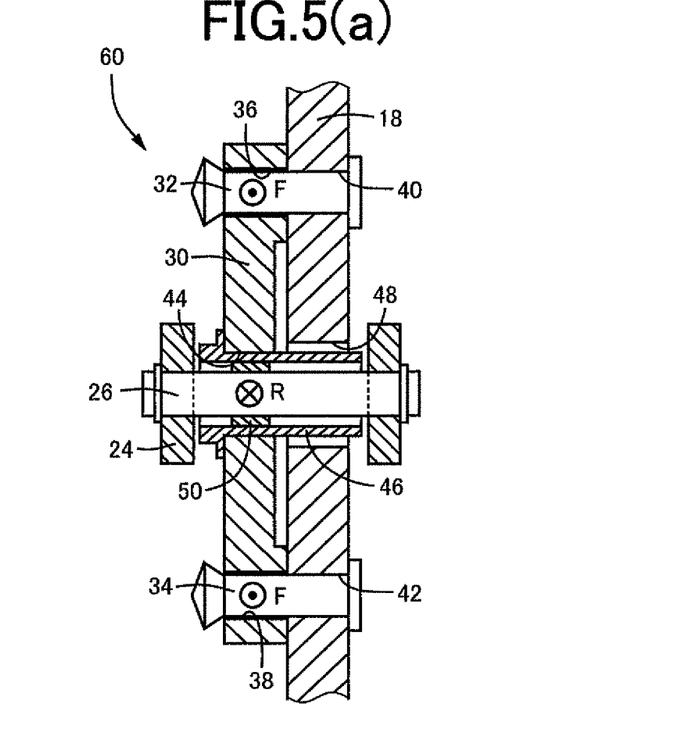
FIG. 5(a) is a sectional view corresponding to FIG. 1(c).
Figure 5B:
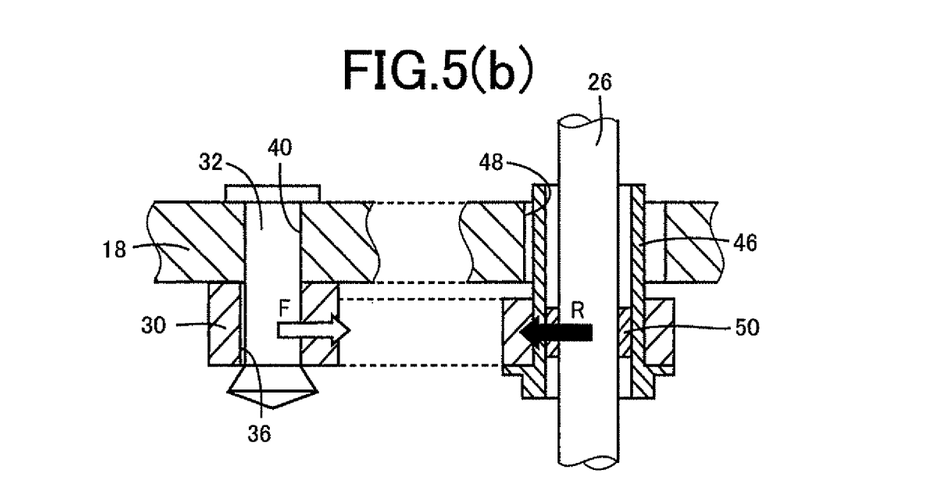
FIG. 5(b) is a sectional view corresponding to FIG. 2(b).
Figure 6A:
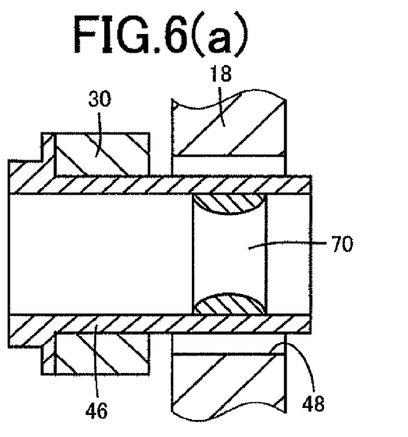
FIG. 6(a), FIG. 6(b), FIG. 6(c), FIG. 6(d) and FIG. 6(e) are a sectional view for explaining other modes that are preferably used as the bushings according to the embodiments of FIG. 1 and FIG. 5.
Figure 6B:
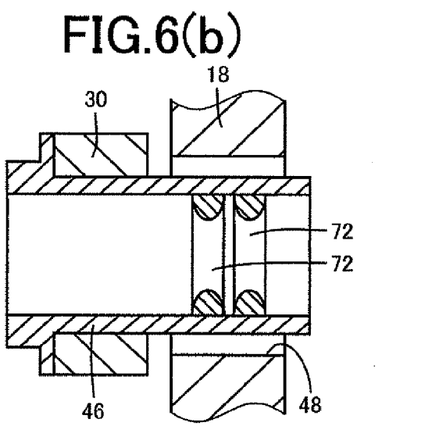
Figure 6C:
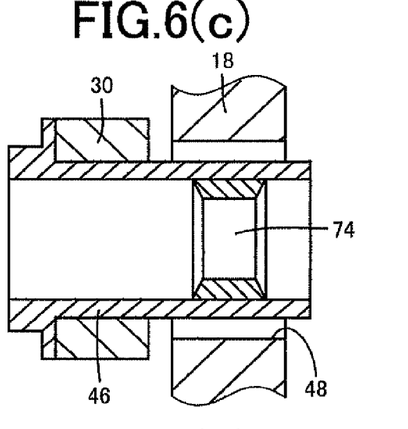
Figure 6D:
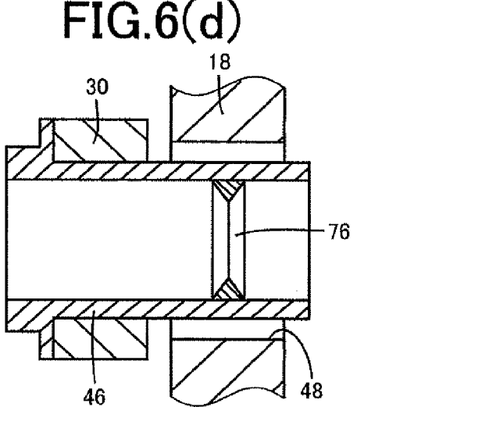
Figure 6E:
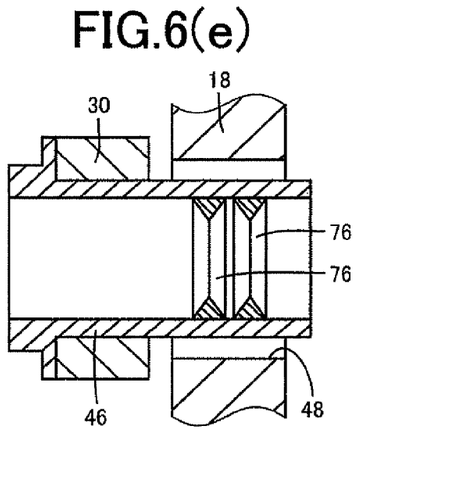

A pedal operation amount detecting device 60 in FIG. 5 shows the case where the pair of support pins 32, 34 are fixedly fitted to the support holes 40, 42 of the pedal arm 18 and are rotatable relative to the pin holes 36, 38 of the sensor member 30, the bushing 50 is fixedly fitted to the inner periphery of the cylindrical collar 46 at a portion located within the range of thickness of the sensor member 30 in the direction parallel to the support axis O, and the operation input portions to which the depression force F is applied and the reaction force applied portion to which the reaction force R is applied are both located within the range of thickness of the sensor member 30. FIG. 5(a) is a sectional view corresponding to FIG. 1(c). FIG. 5(b) is a sectional view corresponding to FIG. 2(b).

In the present embodiment as well, the operation input portions to which the depression force F is applied and the reaction force applied portion to which the reaction force R is applied are set at the positions that overlap with each other (within the range of thickness of the sensor member 30 in the present embodiment) in the direction parallel to the support axis O. Therefore, an offset load due to an offset (deviation in position) between the operation input portions and the reaction force applied portion in the direction parallel to the support axis O is suppressed. Therefore, the posture and deformation manner of the sensor member 30 become stable, and uneven wear of the rotational sliding portions is suppressed. As a result, advantageous effects the same as those of the above-described embodiment are obtained, for example, the detection accuracy and durability improve.

However, when an excess depression force F is applied and the cylindrical collar 46 contacts the through-hole 48, a moment M is generated as shown in FIG. 3(*b*). Therefore, it is desirable that a play between the cylindrical collar 46 and the through-hole 48 be set relatively large and the sensor member 30 having a high strength against a deflection be employed so that the cylindrical collar 46 does not contact the through-hole 48 even when the excess depression force F is applied. Alternatively, a stopper that restricts an excess deformation of the sensor member 30 by contacting the middle portion of the sensor member 30 may be provided on the side face of the pedal arm 18.

FIG. 6(*a*) to FIG. 6(*e*) are views that show other modes of bushings, each of which is fixedly fitted to the inner periphery of the cylindrical collar 46 at a predetermined position by press-fitting, or the like. The inner periphery of a bushing 70 in FIG. 6(*a*) is curved in a circular arc shape in the axial direction so as to bulge inward. FIG. 6(*b*) shows the case where a pair of bushings 72 having the same shape is arranged such that the bushings 72 are slightly apart from each other in the axial direction. The inner peripheries of the bushings 72 are curved so as to bulge inward as in the case in FIG. 6(*a*). A bushing 74 in FIG. 6(*c*) has a trapezoidal section. A bushing 76 in FIG. 6(*d*) has a triangular section. FIG. 6(*e*) shows the case where a pair of the bushings 76 shown in FIG. 6(*d*) are provided such that the bushings 76 are slightly apart from each other in the axial direction.

Figure 7:
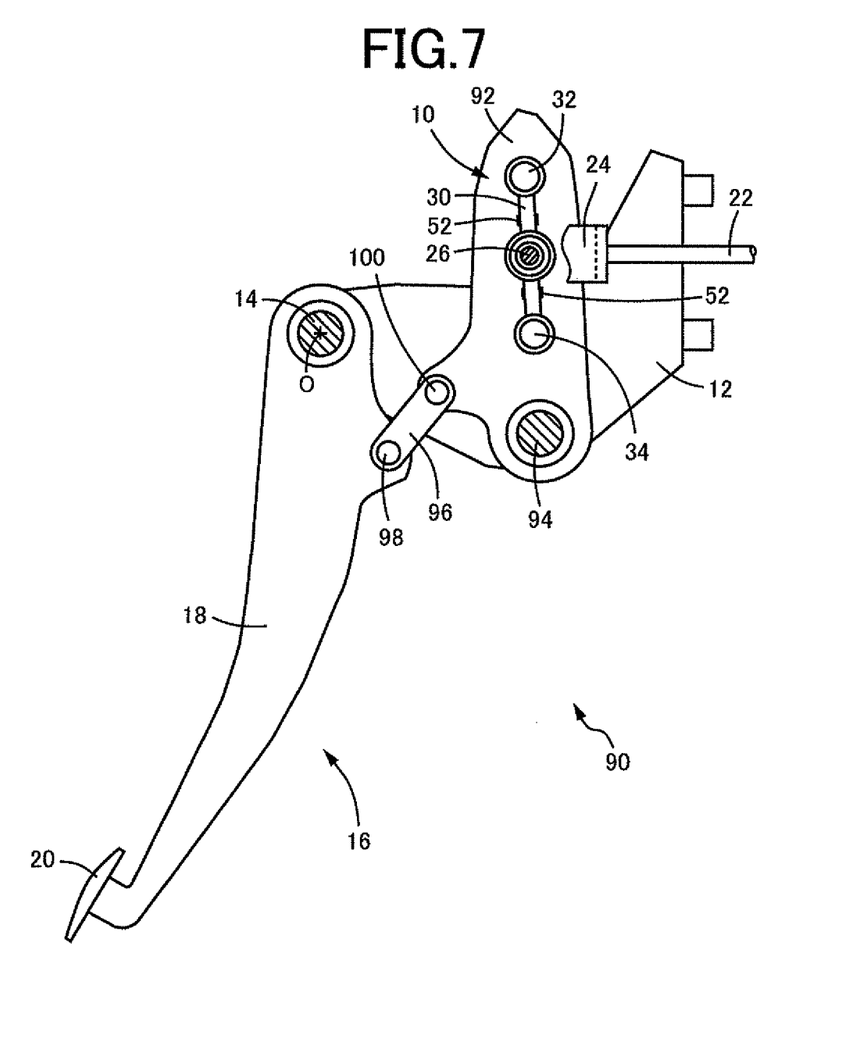
FIG. 7 is a view for explaining one example in the case where the invention is applied to a vehicle operating pedal apparatus including an intermediate lever, and is a right side view corresponding to FIG. 1(b).

A vehicle operating pedal apparatus 90 shown in FIG. 7 includes an intermediate lever 92, and an operating force is transmitted from the operating pedal 16 to the operating rod 22 via the intermediate lever 92. The intermediate lever 92 is pivotably fitted to the pedal support 12 by a support pin 94 arranged parallel to the support shaft 14, and is coupled to the operating pedal 16 via a coupling link 96. The intermediate lever 92 is mechanically pivoted about the support pin 94 in accordance with a depressing operation of the operating pedal 16. The coupling link 96 is pivotably coupled at its respective ends to the operating pedal 16 and the intermediate lever 92 via a pair of coupling pins 98, 100 extending parallel to the support shaft 14.

The pedal operation amount detecting device 10 is arranged on the intermediate lever 92 via the pair of support pins 32, 34, and is coupled to the operating rod 22 via the clevis pin 26 that is passed through the bushing 50 fixedly arranged in the cylindrical collar 46 so as to be rotatable relative to the bushing 50. In the present embodiment as well, advantageous effects substantially the same as those in the embodiment shown in FIG. 1 are obtained. In the present embodiment, the intermediate lever 92 corresponds to the transmitting member, and forms a flat plate shape perpendicular to the support axis O.

Note that, in the embodiment shown in FIG. 7 as well, the pedal operation amount detecting device 60 shown in FIG. 5 may be employed instead of the pedal operation amount detecting device 10. In addition, the pedal operation amount detecting device according to the invention may be provided at one of coupling portions at which the coupling link 96 is pivotably coupled to the pedal arm 18 and the intermediate lever 92 via the coupling pins 98, 100. That is, the pedal operation amount detecting device 10 or 60 may be arranged at a portion of the pedal arm 18, to which the coupling link 96 is coupled and the coupling pin 98 may be passed through the bushing 50 arranged inside the cylindrical collar 46 so as to be rotatable relative to the bushing 50. Alternatively, the pedal operation amount detecting device 10 or 60 may be arranged at a portion of the intermediate lever 92, to which the coupling link 96 is coupled, and the coupling pin 100 may be passed through the bushing 50 arranged inside the cylindrical collar 46 so as to be rotatable relative to the bushing 50.

The embodiments of the invention are described in detail above with reference to the drawings. However, the embodiments described above are merely examples of modes for carrying out the invention. The invention may be implemented in other modes obtained by making various changes or modifications on the basis of the knowledge of persons skilled in the art.

DESCRIPTION OF REFERENCE NUMERALS

8, 90: vehicle operating pedal apparatus 10, 60: pedal operation amount detecting device 16: operating pedal 18: pedal arm (transmitting member) 22: operating rod (output member) 26: clevis pin (coupling pin) 30: sensor member 32, 34: support pins 40, 42: support holes 46: cylindrical collar (cylindrical member) 48: through-hole 50, 70, 72, 74, 76: bushing 92: intermediate lever (transmitting member) 96: coupling link O: support axis F: depression force R: reaction force

The invention claimed is:

1. A pedal operation amount detecting device that is provided in an operating pedal apparatus including a transmitting member having a pedal arm of an operating pedal that is arranged so as to be pivotable about a support axis and that is depressed, and an output member to which a depression force is transmitted from the transmitting member and to which a reaction force corresponding to the depression force is applied, the pedal operation amount detecting device including a sensor member that is arranged on a load transmission path at a position offset from the transmitting member in a direction parallel to the support axis and that is deformed by the depression force and the reaction force, and the pedal operation amount detecting device electrically detecting; a deformation of the sensor member:
    the sensor member being arranged on the transmitting member via a pair of support pins which are parallel to the support axis, respectively, on which a coupling pin is arranged to penetrate the sensor member and relatively rotatable around an axis parallel to the support pin, such that the depression force is applied to the sensor member from one of the transmitting member and the coupling pin, and the reaction force is applied to the sensor member from the other one,
    an operation input portion through which the depression force is applied to the sensor member and a reaction force applied portion through which the reaction force is applied to the sensor member being set at positions that overlap with each other in a direction substantially parallel to the support axis, and
    the sensor member being disposed on one of opposite side faces of the transmitting member, the opposite side faces being opposite to each other in the direction parallel to the support axis.

2. The pedal operation amount detecting device according to claim 1, wherein the transmitting member is a plate-like member that has a flat portion which is perpendicular to the support axis, and is arranged so as to be pivotable about the support axis or an axis that is parallel to the support axis;
    the sensor member has an elongate shape, and is arranged parallel to a side face of the flat portion of the transmitting member;

the pedal operation amount detecting device includes
a cylindrical member that is fixedly arranged at a longitudinal middle portion of the sensor member so as to protrude perpendicularly toward the transmitting member, and that is inserted in a through-hole formed in the transmitting member with a play,
a bushing that is fixedly fitted to an inner side of the cylindrical member so as to be concentric with the cylindrical member, and through which the coupling pin is passed such that the coupling pin is rotatable relative to the bushing and is in sliding contact with an inner periphery of the bushing; and
the pair of support pins are provided at both longitudinal end portions of the sensor member so as to protrude toward the transmitting member in a direction parallel to the cylindrical member, and are respectively inserted in a pair of support holes formed in the transmitting member to support the sensor member.

3. The pedal operation amount detecting device according to claim 2, wherein the pair of support pins are fixedly fitted to the sensor member, and are respectively inserted in the support holes so as to be rotatable relative to the support holes;
the bushing is fixedly fitted to the cylindrical member at a position at which the bushing overlaps with the support holes in the direction substantially parallel to the support axis; and
one of points of contact between the pair of support pins and the support holes and a point of contact between the bushing and the coupling pin functions as the operation input portion, and the other one functions as the reaction force applied portion.

4. The pedal operation amount detecting device according to claim 3, wherein in a state where the transmitting member and the sensor member are placed on an inner side of a bifurcated clevis fixedly fitted to the output member, a clevis pin that serves as the coupling pin is passed through the bushing so as to be rotatable relative to the bushing and so as to extend through the clevis, the transmitting member and the sensor member and protrude on both sides of the clevis; and
the reaction force is applied from the clevis pin to the sensor member via the cylindrical member, and the depression force is applied from the transmitting member to the sensor member via the pair of support pins.

5. The pedal operation amount detecting device according to claim 4, wherein the transmitting member is the pedal arm; and
the depression force is applied from the pedal arm to the sensor member via the pair of support pins, and the reaction force is applied from the coupling pin to the sensor member via the cylindrical member.

6. The pedal operation amount detecting device according to claim 4, wherein
the transmitting member includes an intermediate lever that is arranged so as to be pivotable about an axis parallel to the support axis, and that is coupled to the pedal arm via a coupling link.

7. The pedal operation amount detecting device according to claim 3, wherein the transmitting member is the pedal arm; and
the depression force is applied from the pedal arm to the sensor member via the pair of support pins, and the reaction force is applied from the coupling pin to the sensor member via the cylindrical member.

8. The pedal operation amount detecting device according to claim 3, wherein
the transmitting member includes an intermediate lever that is arranged so as to be pivotable about an axis parallel to the support axis, and that is coupled to the pedal arm via a coupling link.

9. The pedal operation amount detecting device according to claim 2, wherein in a state where the transmitting member and the sensor member are placed on an inner side of a bifurcated clevis fixedly fitted to the output member, a clevis pin that serves as the coupling pin is passed through the bushing so as to be rotatable relative to the bushing and so as to extend through the clevis, the transmitting member and the sensor member and protrude on both sides of the clevis; and
the reaction force is applied from the clevis pin to the sensor member via the cylindrical member, and the depression force is applied from the transmitting member to the sensor member via the pair of support pins.

10. The pedal operation amount detecting device according to claim 9, wherein the transmitting member is the pedal arm; and
the depression force is applied from the pedal arm to the sensor member via the pair of support pins, and the reaction force is applied from the coupling pin to the sensor member via the cylindrical member.

11. The pedal operation amount detecting device according to claim 9, wherein
the transmitting member includes an intermediate lever that is arranged so as to be pivotable about an axis parallel to the support axis, and that is coupled to the pedal arm via a coupling link.

12. The pedal operation amount detecting device according to claim 2, wherein the transmitting member is the pedal arm; and
the depression force is applied from the pedal arm to the sensor member via the pair of support pins, and the reaction force is applied from the coupling pin to the sensor member via the cylindrical member.

13. The pedal operation amount detecting device according to claim 2, wherein
the transmitting member includes an intermediate lever that is arranged so as to be pivotable about an axis parallel to the support axis, and that is coupled to the pedal arm via a coupling link.

14. The pedal operation amount detecting device according to claim 1, wherein:
the transmitting member includes an intermediate lever that is arranged so as to be pivotable about an axis parallel to the support axis, and that is coupled to the pedal arm via a coupling link.

* * * * *